(12) United States Patent
Noy (10) Patent No.: US 11,703,354 B2
(45) Date of Patent: *Jul. 18, 2023

(54) VIDEO DISPLAY SYSTEM AND METHOD

(71) Applicant: ELBIT SYSTEMS LTD., Haifa (IL)

(72) Inventor: Avraham Zeev Noy, Haifa (IL)

(73) Assignee: ELBIT SYSTEMS LTD., Haifa (IL)

(*) Notice: Subject to any disclaimer, the term of this patent is extended or adjusted under 35 U.S.C. 154(b) by 108 days.

This patent is subject to a terminal disclaimer.

(21) Appl. No.: 17/511,592

(22) Filed: Oct. 27, 2021

(65) Prior Publication Data

US 2022/0049974 A1 Feb. 17, 2022

Related U.S. Application Data

(63) Continuation of application No. 17/146,605, filed on Jan. 12, 2021, now Pat. No. 11,187,555, which is a continuation of application No. PCT/IL2020/050609, filed on Jun. 10, 2020.

(30) Foreign Application Priority Data

Jun. 10, 2019 (IL) .......................................... 267211

(51) Int. Cl.
*G01C 23/00* (2006.01)
*G08G 5/00* (2006.01)
(Continued)

(52) U.S. Cl.
CPC ........... *G01C 23/00* (2013.01); *G01C 23/005* (2013.01); *G02B 27/0172* (2013.01);
(Continued)

(58) Field of Classification Search
CPC ...... G01C 23/00; G01C 23/005; G06V 10/25; G06V 20/17; G06V 20/20; G06V 40/18;
(Continued)

(56) References Cited

U.S. PATENT DOCUMENTS 5,388,990 A  2/1995 Beckman
5,719,567 A  2/1998 Norris
(Continued)

FOREIGN PATENT DOCUMENTS

EP  2851864  3/2015
EP  3530521  8/2019

*Primary Examiner* — Peter D Nolan
*Assistant Examiner* — Demetra R Smith-Stewart (57) ABSTRACT

A system for displaying videos, comprising a processing resource configured to: provide a data repository comprising a plurality of previously captured video segments (PCVSs) captured during previous operations of corresponding platforms, each being associated with metadata indicative of a Line-of-Sight (LoS) of a sensor, carried by the corresponding platform of the platforms used to capture the corresponding PCVS, with respect to a fixed coordinate system established in space, during capturing the corresponding PCVS; obtain an indication of a Region-of-Interest (RoI); identify one or more of the PCVSs that include at least part of the RoI, utilizing the LoSs associated with the PCVSs, giving rise to RoI matching PCVSs; and display at least part of at least one of the RoI matching PCVSs, being displayed RoI matching PCVSs, on a display of an operating platform to an operator of the operating platform during a current operation of the operating platform.

20 Claims, 5 Drawing Sheets

(51) Int. Cl.
    *G05D 1/02*         (2020.01)
    *G02B 27/01*       (2006.01)
    *G06V 10/25*       (2022.01)
    *G06V 20/13*       (2022.01)
    *G06V 20/17*       (2022.01)
    *G06V 20/20*       (2022.01)
    *G06V 40/18*       (2022.01)

(52) U.S. Cl.
    CPC ........... *G05D 1/0202* (2013.01); *G06V 10/25* (2022.01); *G06V 20/13* (2022.01); *G06V 20/17* (2022.01); *G06V 20/20* (2022.01); *G06V 40/18* (2022.01); *G08G 5/003* (2013.01); *G08G 5/0021* (2013.01)

(58) Field of Classification Search
    CPC .. G06V 20/13; G02B 27/0172; G05D 1/0202; G08G 5/0021; G08G 5/003
    See application file for complete search history.

(56) References Cited

U.S. PATENT DOCUMENTS

| | | |
|---|---|---|
| 7,119,831 B2 | 10/2006 | Ohto et al. |
| 7,642,929 B1 | 1/2010 | Pinkus et al. |
| 7,737,965 B2 | 6/2010 | Alter et al. |
| 9,269,239 B1 | 2/2016 | Jensen et al. |
| 9,460,554 B2 | 10/2016 | Azulai et al. |
| 10,375,407 B2 | 8/2019 | Varadarajan et al. |
| 2003/0060248 A1 | 3/2003 | Yamashita |
| 2005/0021202 A1 | 1/2005 | Russell et al. |
| 2006/0087452 A1 | 4/2006 | Scherbarth |
| 2006/0146053 A1 | 7/2006 | Gatewood et al. |
| 2007/0005199 A1 | 1/2007 | He |
| 2007/0171094 A1 | 7/2007 | Alter et al. |
| 2008/0158256 A1 | 7/2008 | Russell et al. |
| 2008/0215204 A1 | 9/2008 | Roy et al. |
| 2010/0113149 A1 | 5/2010 | Suddreth et al. |
| 2010/0231418 A1 | 9/2010 | Whitlow et al. |
| 2010/0321488 A1 | 12/2010 | Soler |
| 2011/0064312 A1 | 3/2011 | Janky et al. |
| 2013/0002454 A1 | 1/2013 | Burns et al. |
| 2016/0350601 A1 | 12/2016 | Grauer et al. |
| 2016/0364823 A1 | 12/2016 | Cao |
| 2017/0214879 A1 | 7/2017 | Perruchot et al. |
| 2017/0314925 A1 | 11/2017 | Royster et al. |
| 2017/0345321 A1 | 11/2017 | Cross et al. |
| 2018/0157455 A1 | 6/2018 | Troy et al. |
| 2019/0356894 A1 | 11/2019 | Oh et al. |
| 2020/0153885 A1 | 5/2020 | Lee et al. |
| 2020/0322587 A1 | 10/2020 | Oh et al. |
| 2021/0019942 A1 | 1/2021 | Ophir et al. |

310 — provide a data repository comprising a plurality of previously captured video segments (PCVSs) captured during previous operations of corresponding platforms, wherein each of the PCVSs being associated with metadata indicative of a Line-of-Sight (LoS) of a sensor, carried by the corresponding platform of the platforms used to capture the corresponding PCVS, during capturing the corresponding PCVS, with respect to a fixed coordinate system established in space 320 — obtain an indication of a Region-of-Interest (RoI)

330 — identify one or more of the PCVSs that include at least part of the RoI, utilizing the LoSs associated with the PCVSs, giving rise to RoI matching PCVSs 340 — display at least part of at least one of the RoI matching PCVSs, being displayed RoI matching PCVSs, on a display of an operating platform to an operator of the operating platform during a current operation of the operating platform

VIDEO DISPLAY SYSTEM AND METHOD

TECHNICAL FIELD

The invention relates to a video display system and method.

BACKGROUND

A Synthetic Vision System (SVS) is a computer-mediated reality system for vehicular platforms (e.g. aerial vehicles, land vehicles, nautical vehicles), that uses three-dimensions to provide operators of such platforms (e.g. pilots, drivers, sailors) with clear and intuitive means of understanding their environment. Such system is aimed at improving the situational awareness of the operators. For this purpose, SVS utilizes information from various data sources, such as Data Terrain Models (DTMs), obstacle information, geographical information, aeronautical information, etc.

In some cases, platforms are equipped with an Enhanced Vision System (EVS) which includes an imaging sensor(s) that can capture real-time visual information of an imaged scene for display to the operator of the platform. In such cases, the imaged scene, imaged by the imaging sensors of the EVS, can be combined with synthetic information generated by the SVS to generate a combined view of the imaged scene.

However, in many cases, platforms do not have an EVS, and in such cases, the situational awareness of the operator of the platform is degraded. Even in cases where an EVS exists, the images captured thereby may be of poor quality, e.g. due to weather conditions (e.g. fog, rain, snow, clouds, etc.), light conditions (e.g. dazzling, darkness, shading, etc.), or any other reason.

Accordingly, it would be beneficial to have the ability to use previously obtained videos of regions of interest that were acquired by imaging sensors during previous operations of the platform or of another platform. This enables improving situational awareness in platforms that do not have an EVS, or in platforms that have an EVS, however due to external conditions the quality of the images captures by the EVS's imaging sensor(s) is lower than the quality of the images captured during previous operations of the same platform, or of another platform.

There is thus a need in the art for a new video display system and method.

References considered to be relevant as background to the presently disclosed subject matter are listed below. Acknowledgement of the references herein is not to be inferred as meaning that these are in any way relevant to the patentability of the presently disclosed subject matter.

US Patent application No. 2008/0158256 (Russell et al.) published on Jul. 3, 2008 discloses a method and system for providing a perspective view image created by fusing a plurality of sensor data for supply to a platform operator with a desired viewing perspective within an area of operation is disclosed. A plurality of sensors provide substantially real-time data of an area of operation, a processor combines the substantially real-time data of the area of operation with digital terrain elevation data of the area of operation and positional data of a platform operator to create a digital cartographic map database having substantially real-real time sensor data, a memory for storing the digital cartographic map database, a perspective view data unit inputs data regarding a desired viewing perspective of the operator within the area of operation with respect to the digital cartographic map database to provide a perspective view image of the area of operation, and a display for displaying the perspective view image to the operator.

U.S. Pat. No. 7,642,929 (Pinkus et al.) published on Jan. 5, 2010 discloses an electromagnetic emissions free optical signal based helicopter landing assistance arrangement wherein helicopter rotor wash dust cloud-caused obfuscation of the intended landing site and other landing threats are overcome. Real time optical sourced data is collected early and used during helicopter approach to the intended landing site. Upgrading of this data for use during dust cloud presence is accomplished with image processing techniques applied in response to such inputs as helicopter flight data. Military use of the invention especially in current theatre conflict environments is contemplated. Dust cloud related landing hazards are disclosed as a significant difficulty in such environments and generate need for the invention.

US Patent application No. 2010/0231418 (Whitlow et al.) published on Sep. 16, 2010 discloses systems and methods for displaying information on a display device associated with an aircraft. A method comprises rendering a perspective view of terrain on a display device and obtaining sensor data for a sensing region overlapping at least a portion of the viewing region. The method further comprises obtaining tracking data associated with a first object located within the sensing region and correlating a first portion of the sensor data that corresponds to the first object with the tracking data. The method further comprises rendering a graphical representation of the first object on the display device, wherein positioning of the graphical representation of the first object with respect to the terrain is influenced by the correlation with first portion of the sensor data.

US Patent application No. 2006/0087452 (Scherbarth) published on Apr. 27, 2006 discloses a method and system for supporting pilots in landing helicopters in visual flight under brownout or whiteout conditions. According to the invention, 3D data of the planned landing site are generated during the approach for landing, and are accumulated into a 3D representation of the landing site with the aid of position and attitude data of the helicopter. From this 3D representation, a virtual external view is continuously generated corresponding to the perspective of the actual position and attitude of the helicopter and is displayed for the pilot. A control routine ensures that no 3D data of the planned landing site that are generated under brownout or whiteout conditions are taken into account in the accumulation of the 3D representation.

US Patent application No. 2017/0345321 (Cross et al.) published on Nov. 30, 2017 discloses an imaging system for a moving vehicle aggregates pre-existing data with sensor data to provide an image of the surrounding environment in real-time. The pre-existing data are combined with data from one or more 3-D sensors, and 2-D information from a camera, to create a scene model that is rendered for display. The system accepts data from a 3-D sensor, transforms the data into a 3-D data structure, fuses the pre-existing scene data with the 3-D data structure and 2-D image data from a 2-D sensor to create a combined scene model, and renders the combined scene model for display. The system may also weight aspects of data from first and second sensors to select at least one aspect from the first sensor and another aspect from the second sensor; wherein fusing the pre-existing scene data with the sensor data uses the selected aspect from the first sensor and the selected aspect from the second sensor.

GENERAL DESCRIPTION

In accordance with a first aspect of the presently disclosed subject matter, there is provided a system for displaying videos, comprising a processing resource configured to: provide a data repository comprising a plurality of previously captured video segments (PCVSs) captured during previous operations of corresponding platforms, wherein each of the PCVSs being associated with metadata indicative of a Line-of-Sight (LoS) of a sensor, carried by the corresponding platform of the platforms used to capture the corresponding PCVS, with respect to a fixed coordinate system established in space, during capturing the corresponding PCVS; obtain an indication of a Region-of-Interest (RoI); identify one or more of the PCVSs that include at least part of the RoI, utilizing the LoSs associated with the PCVSs, giving rise to RoI matching PCVSs; and display at least part of at least one of the RoI matching PCVSs, being displayed RoI matching PCVSs, on a display of an operating platform to an operator of the operating platform during a current operation of the operating platform.

In some cases, the displayed RoI matching PCVSs are identified so that the at least part of the RoI shown in each of the displayed RoI matching PCVSs meets a visibility criterion.

In some cases, each of the PCVSs is associated with a respective visibility score, indicative of the visibility of the RoI within the respective PCVS, and wherein the displayed RoI matching PCVSs are associated with respective visibility scores higher than the visibility scores of the PCVSs excluding the displayed RoI matching PCVSs.

In some cases, the visibility scores are provided by users.

In some cases, the metadata further comprises operation conditions indicative of conditions during capturing of the corresponding PCVS, and wherein the processing resource is further configured to obtain information of current operation conditions at a current time during performance of the current operation, and wherein the RoI matching PCVSs are identified also utilizing the current operation conditions and the operation conditions.

In some cases, the operation conditions include one or more of the following: a time-of-day at which the corresponding PCVS was captured; a date at which the corresponding PCVS was captured; an identifier of an operator of the PCVS which operated the platform when the corresponding PCVS was captured; weather conditions at a location on which the corresponding PCVS was captured and on the time-of-day in which the corresponding PCVS was captured; or a Head Mounted Display (HMD) LoS designation when the corresponding PCVS was captured with respect to the fixed coordinate system established in space.

In some cases, the current operation conditions include one or more of the following: a current time-of-day; a current date; an identifier of an operator of the operating platform; a current LoS of the operating platform with respect to the RoI; weather conditions at a current location of the operating platform and a current time of day; or a current Head Mounted Display (HMD) LoS designation with respect to the fixed coordinate system established in space.

In some cases, the displayed RoI matching PCVSs are adjusted, before their display, to compensate for differences between (a) the current LoS of the operating platform with respect to the RoI and (b) the LoS of the sensor carried by the corresponding platform, used to capture the corresponding PCVS with respect to the fixed coordinate system established in space.

In some cases, the RoI is determined using information of a navigation route of the operating platform.

In some cases, the navigation route is pre-determined.

In some cases, the operating platform is an airborne platform, a land vehicle, a sea vehicle, or a mounted platform mounted on a human user.

In some cases, the current operation is landing of the airborne platform.

In some cases, the RoI matching PCVSs are anchored to earth coordinates of the RoI.

In some cases, RoI is determined using information of a current Head Mounted Display (HMD) LoS designation of an HMD worn by the operator of the operating platform.

In some cases, the displayed RoI matching PCVSs are displayed as an overlay over another video.

In some cases, the processing resource is further configured to: obtain additional indications of additional RoIs; identify one or more of the PCVSs that include at least part of the additional RoIs, utilizing the LoSs associated with the PCVSs, giving rise to additional RoI matching PCVSs; and display at least part of the additional RoI matching PCVSs, being additional displayed RoI matching PCVSs, on the display of the operating platform as additional overlays over the another video.

In some cases, the displayed RoI matching PCVSs are displayed blended with another video.

In some cases, the displayed RoI matching PCVSs are displayed with computer generated symbology.

In some cases, the displayed RoI matching PCVSs are selected from the RoI matching PCVSs based on preferences of the operator of the operating platform.

In some cases, the processing resource is further configured to obtain a simulated LoS with respect to the RoI; and wherein the displayed RoI matching PCVSs selected from the RoI matching to PCVSs also utilizing the simulated LoS.

In some cases, the simulated LoS is determined based on an estimation of a location of the operating platform at a future point in time.

In some cases, the displayed RoI matching PCVSs are adjusted, before their display, to compensate for differences between (a) the simulated LoS of the operating platform with respect to the RoI and (b) the Line-of-Sight (LoS) of the sensor carried by the corresponding platform, used to capture the corresponding PCVS with respect to the fixed coordinate system established in space.

In some cases, at least one of the PCVSs was captured during previous operations of the operating platform.

In some cases, at least one of the PCVSs was captured during previous operations of a given platform other than the operating platform.

In some cases, at least one of the PCVSs is an enhanced PCVS, generated by combining a first PCVS with at least part of a second PCVS to provide the enhances PCVS having enhanced visibility with respect to the first PCVS and the second PCVS.

In accordance with a second aspect of the presently disclosed subject matter, there is provided a method for displaying videos, the method comprising: providing a data repository comprising a plurality of previously captured video segments (PCVSs) captured during previous operations of corresponding platforms, wherein each of the PCVSs being associated with metadata indicative of a Line-of-Sight (LoS) of a sensor, carried by the corresponding platform of the platforms used to capture the corresponding PCVS, with respect to a fixed coordinate system established in space, during capturing the corresponding PCVS; obtaining, by a processing resource, an indication of a Region-of-Interest (RoI); identifying, by the processing resource, one or more of the PCVSs that include at least part of the RoI, utilizing the LoSs associated with the PCVSs, giving rise to RoI matching PCVSs; and displaying, by the processing resource, at least part of at least one of the RoI matching PCVSs, being displayed RoI matching PCVSs, on a display of an operating platform to an operator of the operating platform during a current operation of the operating platform.

In some cases, the displayed RoI matching PCVSs are identified so that the at least part of the RoI shown in each of the displayed RoI matching PCVSs meets a visibility criterion.

In some cases, each of the PCVSs is associated with a respective visibility score, indicative of the visibility of the RoI within the respective PCVS, and wherein the displayed RoI matching PCVSs are associated with respective visibility scores higher than the visibility scores of the PCVSs excluding the displayed RoI matching PCVSs.

In some cases, the visibility scores are provided by users.

In some cases, the metadata further comprises operation conditions indicative of conditions during capturing of the corresponding PCVS, and wherein the method further comprises obtaining information of current operation conditions at a current time during performance of the current operation, and wherein the RoI matching PCVSs are identified also utilizing the current operation conditions and the operation conditions.

In some cases, the operation conditions include one or more of the following: a time-of-day at which the corresponding PCVS was captured; a date at which the corresponding PCVS was captured; an identifier of an operator of the PCVS which operated the platform when the corresponding PCVS was captured; weather conditions at a location on which the corresponding PCVS was captured and on the time-of-day in which the corresponding PCVS was captured; or a Head Mounted Display (HMD) LoS designation when the corresponding PCVS was captured with respect to the fixed coordinate system established in space.

In some cases, the current operation conditions include one or more of the following: a current time-of-day; a current date; an identifier of an operator of the operating platform; a current LoS of the operating platform with respect to the RoI; weather conditions at a current location of the operating platform and a current time of day; or a current Head Mounted Display (HMD) LoS designation with respect to the fixed coordinate system established in space.

In some cases, the displayed RoI matching PCVSs are adjusted, before their display, to compensate for differences between (a) the current LoS of the operating platform with respect to the RoI and (b) the LoS of the sensor carried by the corresponding platform, used to capture the corresponding PCVS with respect to the fixed coordinate system established in space.

In some cases, the RoI is determined using information of a navigation route of the operating platform.

In some cases, the navigation route is pre-determined.

In some cases, the operating platform is an airborne platform, a land vehicle, a sea vehicle, or a mounted platform mounted on a human user.

In some cases, the current operation is landing of the airborne platform.

In some cases, the RoI matching PCVSs are anchored to earth coordinates of the RoI.

In some cases, the RoI is determined using information of a current Head Mounted Display (HMD) LoS designation of an HMD worn by the operator of the operating platform.

In some cases, the displayed RoI matching PCVSs are displayed as an overlay over another video.

In some cases, the method further comprises: obtaining, by the processing resource, additional indications of additional RoIs; identifying, by the processing resource, one or more of the PCVSs that include at least part of the additional RoIs, utilizing the LoSs associated with the PCVSs, giving rise to additional RoI matching PCVSs; and displaying, by the processing resource, at least part of the additional RoI matching PCVSs, being additional displayed RoI matching PCVSs, on the display of the operating platform as additional overlays over the another video.

In some cases, the displayed RoI matching PCVSs are displayed blended with another video.

In some cases, the displayed RoI matching PCVSs are displayed with computer generated symbology.

In some cases, the displayed RoI matching PCVSs are selected from the RoI matching PCVSs based on preferences of the operator of the operating platform.

In some cases, the method further comprises obtaining, by the processing resource, a simulated LoS with respect to the RoI; and wherein the displayed RoI matching PCVSs selected from the RoI matching PCVSs also utilizing the simulated LoS.

In some cases, the simulated LoS is determined based on an estimation of a location of the operating platform at a future point in time.

In some cases, the displayed RoI matching PCVSs are adjusted, before their display, to compensate for differences between (a) the simulated LoS of the operating platform with respect to the RoI and (b) the Line-of-Sight (LoS) of the sensor carried by the corresponding platform, used to capture the corresponding PCVS with respect to the fixed coordinate system established in space.

In some cases, at least one of the PCVSs was captured during previous operations of the operating platform.

In some cases, at least one of the PCVSs was captured during previous operations of a given platform other than the operating platform.

In some cases, at least one of the PCVSs is an enhanced PCVS, generated by combining a first PCVS with at least part of a second PCVS to provide the enhances PCVS having enhanced visibility with respect to the first PCVS and the second PCVS.

In accordance with a third aspect of the presently disclosed subject matter, there is provided a system for estimating a position of an operating platform, the system comprising a processing resource configured to: provide a data repository comprising a plurality of previously captured video segments (PCVSs) captured during previous operations of corresponding platforms and anchored to earth coordinates, wherein each of the PCVSs being associated with metadata indicative of a Line-of-Sight (LoS) of a sensor, carried by the corresponding platform of the platforms used to capture the corresponding PCVS, with respect to the earth coordinates, during capturing the corresponding PCVS; obtain an indication of a Region-of-Interest (RoI) and an image captured by a scene sensing sensor of the operating platform, the image including the RoI; identify one or more of the PCVSs that include at least part of the RoI, utilizing the LoSs associated with the PCVSs, giving rise to RoI matching PCVSs; and determine the position of the operating platform by comparing the image with at least one frame of at least one of the RoI matching PCVSs.

In accordance with a fourth aspect of the presently disclosed subject matter, there is provided a method for estimating a position of an operating platform, the method comprising: providing a data repository comprising a plurality of previously captured video segments (PCVSs) captured during previous operations of corresponding platforms and anchored to earth coordinates, wherein each of the PCVSs being associated with metadata indicative of a Line-of-Sight (LoS) of a sensor, carried by the corresponding platform of the platforms used to capture the corresponding PCVS, with respect to the earth coordinates, during capturing the corresponding PCVS; obtaining, by a processing resource, an indication of a Region-of-Interest (RoI) and an image captured by a scene sensing sensor of the operating platform, the image including the RoI; identifying, by a processing resource, one or more of the PCVSs that include at least part of the RoI, utilizing the LoSs associated with the PCVSs, giving rise to RoI matching PCVSs; and determining, by a processing resource, the position of the operating platform by comparing the image with at least one frame of at least one of the RoI matching PCVSs.

In accordance with a fifth aspect of the presently disclosed subject matter, there is provided a non-transitory computer readable storage medium having computer readable program code embodied therewith, the computer readable program code, executable by at least one processor of a computer to perform a method comprising: providing a data repository comprising a plurality of previously captured video segments (PCVSs) captured during previous operations of corresponding platforms, wherein each of the PCVSs being associated with metadata indicative of a Line-of-Sight (LoS) of a sensor, carried by the corresponding platform of the platforms used to capture the corresponding PCVS, with respect to a fixed coordinate system established in space, during capturing the corresponding PCVS; obtaining, by a processing resource, an indication of a Region-of-Interest (RoI); identifying, by the processing resource, one or more of the PCVSs that include at least part of the RoI, utilizing the LoSs associated with the PCVSs, giving rise to RoI matching PCVSs; and displaying, by the processing resource, at least part of at least one of the RoI matching PCVSs, being displayed RoI matching PCVSs, on a display of an operating platform to an operator of the operating platform during a current operation of the operating platform.

In accordance with a sixth aspect of the presently disclosed subject matter, there is provided a non-transitory computer readable storage medium having computer readable program code embodied therewith, the computer readable program code, executable by at least one processor of a computer to perform a method comprising: providing a data repository comprising a plurality of previously captured video segments (PCVSs) captured during previous operations of corresponding platforms and anchored to earth coordinates, wherein each of the PCVSs being associated with metadata indicative of a Line-of-Sight (LoS) of a sensor, carried by the corresponding platform of the platforms used to capture the corresponding PCVS, with respect to the earth coordinates, during capturing the corresponding PCVS; obtaining, by a processing resource, an indication of a Region-of-Interest (RoI) and an image captured by a scene sensing sensor of the operating platform, the image including the RoI; identifying, by a processing resource, one or more of the PCVSs that include at least part of the RoI, utilizing the LoSs associated with the PCVSs, giving rise to RoI matching PCVSs; and determining, by a processing resource, the position of the operating platform by comparing the image with at least one frame of at least one of the RoI matching PCVSs.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "identifying", "displaying", "adjusting" or the like, include action and/or processes of a computer that manipulate and/or transform data into other data, said data represented as physical quantities, e.g. such as electronic quantities, and/or said data representing the physical objects. The terms "computer", "processor", "processing resource" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 4:
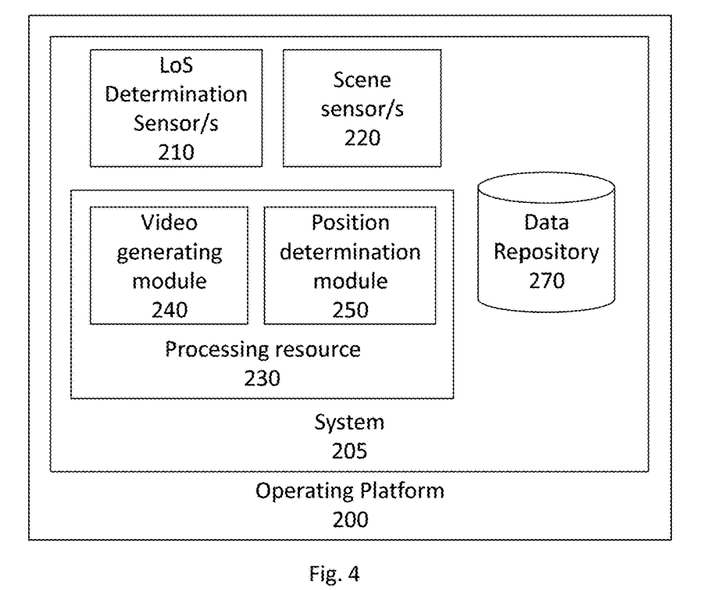
FIG. 4 is a block diagram schematically illustrating one example of a video display system, in accordance with the presently disclosed subject matter.
Figure 5:
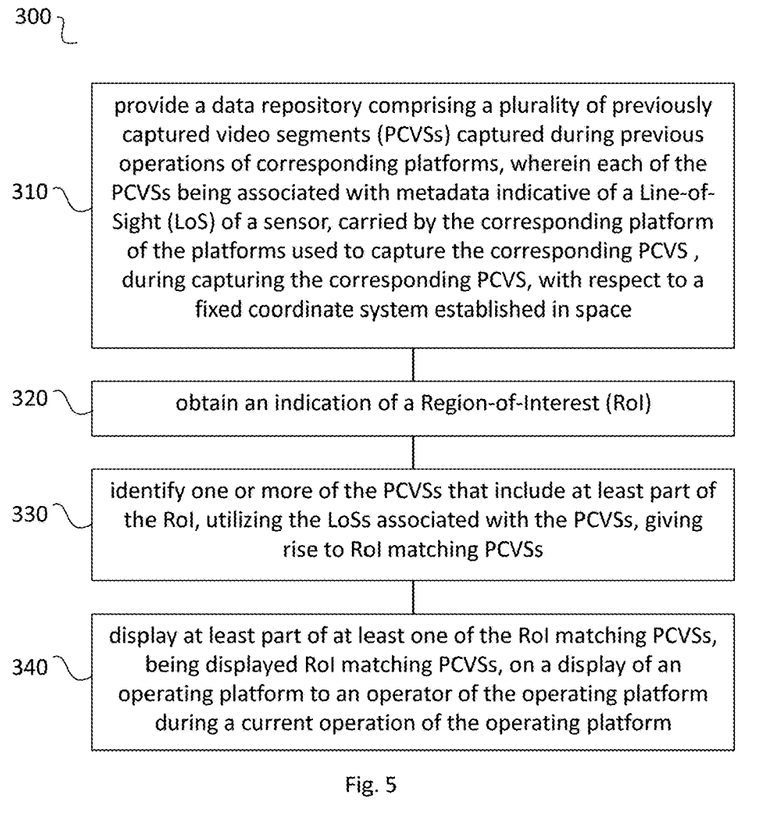
FIG. 5 is a flowchart illustrating one example of a sequence of operations carried out for synthesizing videos of a Region of Interest (RoI), in accordance with the presently disclosed subject matter.
Figure 6:
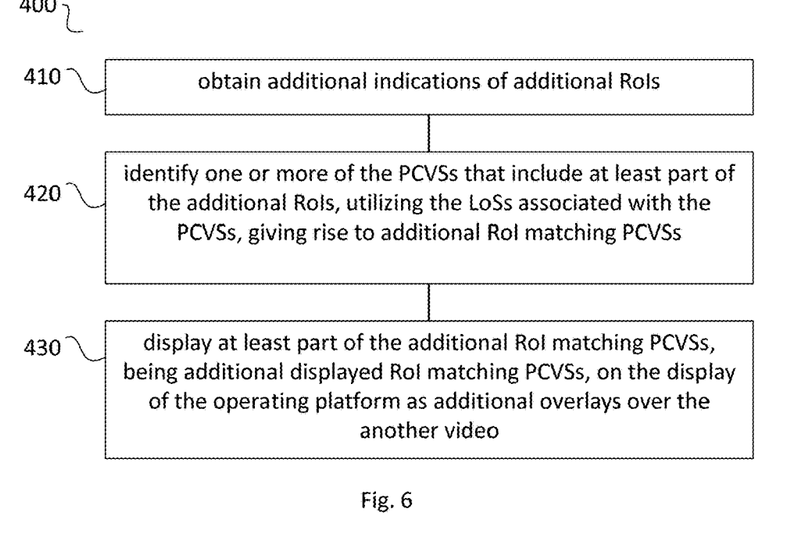
FIG. 6 is a flowchart illustrating one example of a sequence of operations carried out for synthesizing videos of a plurality of Regions of Interest (RoIs), in accordance with the presently disclosed subject matter.
Figure 7:
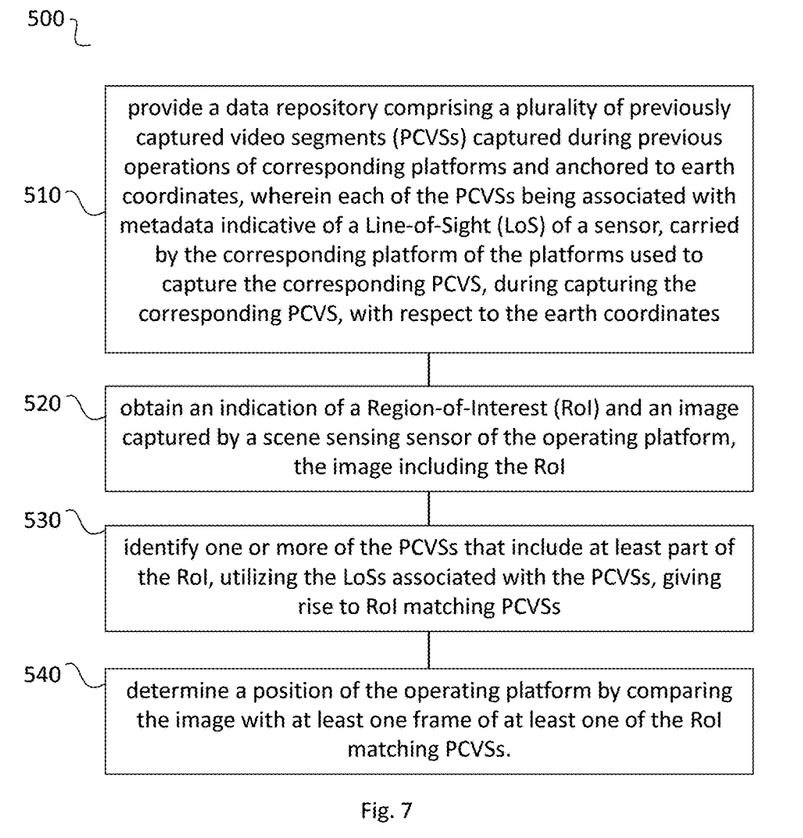
FIG. 7 is a flowchart illustrating one example of a sequence of operations carried out for determining a position of an operating platform, in accordance with the presently disclosed subject matter.

In embodiments of the presently disclosed subject matter, fewer, more and/or different stages than those shown in FIGS. 5-7 may be executed. In embodiments of the presently disclosed subject matter one or more stages illustrated in FIGS. 5-7 may be executed in a different order and/or one or more groups of stages may be executed simultaneously. FIG. 4 illustrates a general schematic of the system architecture in accordance with an embodiment of the presently disclosed subject matter. Each module in FIG. 4 can be made up of any combination of software, hardware and/or firmware that performs the functions as defined and explained herein. The modules in FIG. 4 may be centralized in one location or dispersed over more than one location. In other embodiments of the presently disclosed subject matter, the system may comprise fewer, more, and/or different modules than those shown in FIG. 4.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1A:
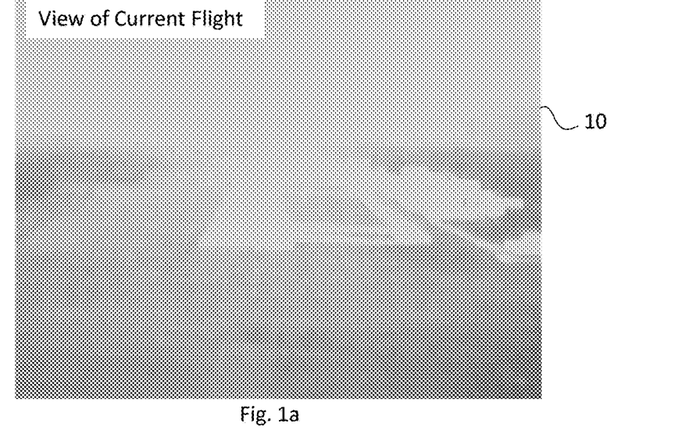
FIG. 1a is an example of a video frame including a Region of Interest (RoI), captured by a sensor during an operation at poor conditions, in accordance with the prior art.
Figure 1B:
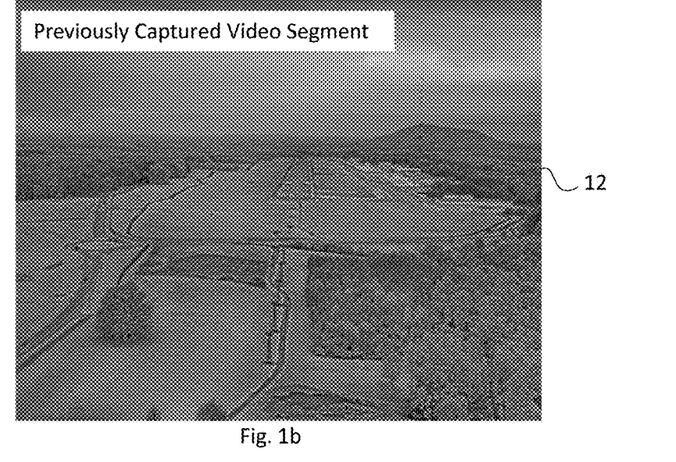
FIG. 1b is an example of a video frame including the Region of Interest (RoI) shown in FIG. 1a, captured by a sensor during a previous operation at better conditions, in accordance with the prior art.

Bearing this in mind, attention is drawn to FIG. 1a, an example of a video frame including a Region of Interest (RoI), captured by a sensor during an operation at poor conditions, in accordance with the prior art. The video frame 10 shown in FIG. 1a shows a scenery (including an airport with several runways) captured by a camera and displayed to a pilot of an aircraft approaching landing in poor weather conditions. Clearly viewing a video captured at poor weather conditions does not aid the pilot's situational awareness. FIG. 1b on the other hand is an example of a video frame 12 including the same RoI shown in FIG. 1a, captured by a sensor at a past time during a previous operation at better conditions (better than those in which the video frame 10 shown in FIG. 1a was captured), in accordance with the prior art. Clearly, the situational awareness of a pilot presented with video frame 12 is much better than the situational awareness of a pilot presented with the video frame 10 of FIG. 1a. Accordingly, viewing a video that was captured during a previous operation at better conditions, will result in improved situational awareness for the pilot. Hence, it is desirable to have the ability to display such previously captured videos to pilots during active flights, to improve their situational awareness.

It is to be noted that when reference is made herein to an operation, it means an activity period starting when a platform leaves a source location and ending when the platform reaches its destination location. For an aircraft, an operation can start at takeoff and end at landing. For a nautical vehicle an operation can start when it leaves a source port and end when it reaches a destination port. For a land vehicle, an operation can start when it starts driving from a parking space at a source location, and end when it parks at a parking space at a destination location.

According to the presently disclosed subject matter, there is provided a system and a method for presenting past videos of a scene in-front/instead/blended with standard SVS, or in-front/instead/blended with Enhanced Vision System (EVS) video and/or with related symbology, as further detailed herein.

Accordingly, when looking at the example shown at FIG. 1a, instead of displaying the video captured by the sensor of the aircraft at real time, when the aircraft is flying at bad weather conditions, the system in accordance with the presently disclosed subject matter can display another video captured at better weather conditions, such as the frame from a video shown on FIG. 1b.

Figure 2A:
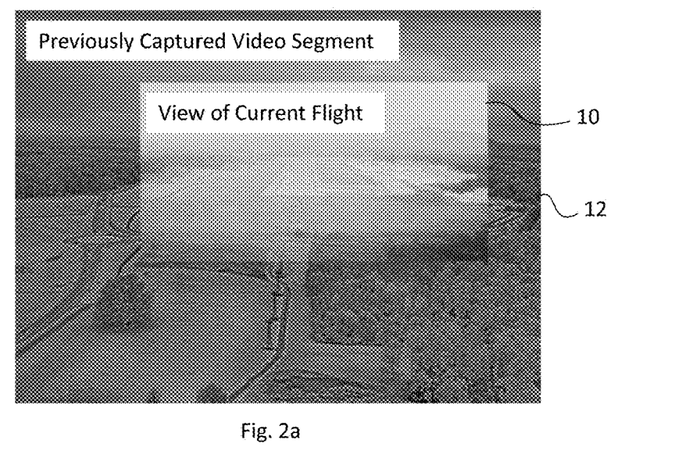
FIG. 2a is an example of blending video frame including a Region of Interest (RoI) captured by a sensor during an active operation at poor conditions with a video frame including the RoI captured during a previous operation at better conditions, in accordance with the presently disclosed subject matter.

Additionally, or alternatively, the system in accordance with the presently disclosed subject matter can blend a video captured by the sensor of the aircraft at real time during bad weather conditions, with another video captured at better weather conditions, as shown on FIG. 2a, where the video frame 10 of FIG. 1a is blended with video frame 12 of FIG. 1b.

Figure 2B:
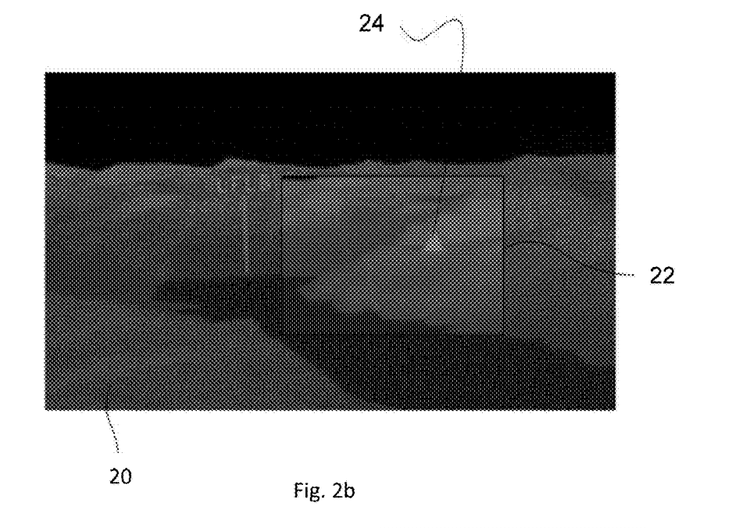
FIG. 2b is an example of a video frame generated by blending a video frame including a Region of Interest (RoI) as generated by a Synthetic Vision System (SVS), with a video frame including the RoI captured during a previous operation, with an addition of a marking of an object within the RoI, in accordance with the presently disclosed subject matter.

Additionally, or alternatively, the system in accordance with the presently disclosed subject matter can enhance SVS by marking/emphasizing various objects, as shown in FIG. 2b, where an SVS 20 is shown, blended with a previously captured video 22, in which an object 24 is emphasized by marking it with a triangle on the previously captured video 22.

Figure 2C:
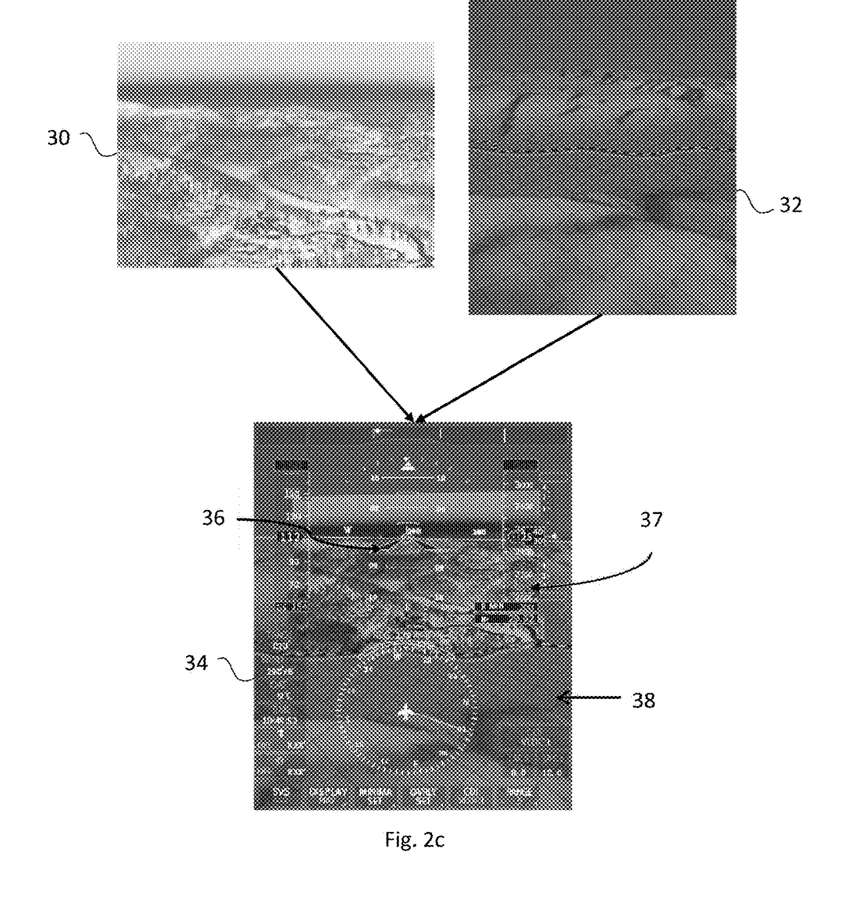
FIG. 2c is an example of a video frame generated by blending a video frame including a Region of Interest (RoI) as generated by a Synthetic Vision System (SVS), with a video frame including the RoI captured during a previous operation, in accordance with the presently disclosed subject matter.

Additionally, or alternatively, the system in accordance with the presently disclosed subject matter can blend a video frame 38 including a Region of Interest (RoI) as generated by a Synthetic Vision System (SVS), with a video frame 37 including the RoI captured during a previous operation (unlike standard Combined Vision Systems (CVSs) which do not use videos captured during previous operations but utilize real time videos instead), with an addition of a marking of objects 36 (in the illustrated example—two runways of an airport) within the RoI, as shown, for example, in FIG. 2c.

Figure 2D:
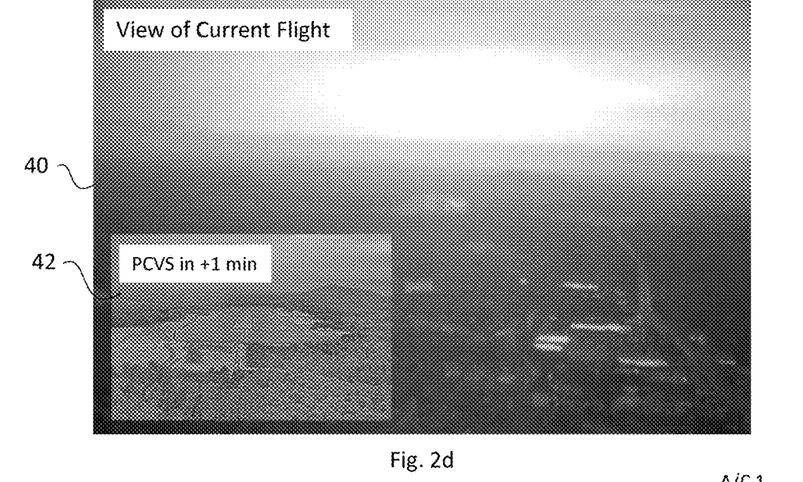
FIG. 2d is an example of blending video frame including a Region of Interest (RoI) captured by a sensor of a platform during an active operation with a video frame including the RoI from a predicted Line of Sight (LoS) of the platform captured during a previous operation, in accordance with the presently disclosed subject matter.

Additionally, or alternatively, the system in accordance with the presently disclosed subject matter can blend a video frame 40 including a Region of Interest (RoI) captured by a sensor of a platform during an active operation with a video frame 42 including the RoI from a predicted Line of Sight (LoS) of the platform as captured during a previous operation, as shown, for example, in FIG. 2d.

It is to be noted that although reference is made in the description to aircrafts, the presently disclosed subject matter is by no means thus limited, and it can be applied to any other platform, including an airborne platform, a land vehicle, a sea vehicle, a mounted platform mounted on a human user, or any other platform, mutatis mutandis.

According to the presently disclosed subject matter, as further detailed herein, a data repository is provided, comprising a plurality of previously captured video segments (PCVSs) captured during previous operations of platforms. Each of the PCVSs is associated with metadata indicative of a Line-of-Sight (LoS) of a sensor, carried by the corresponding platform of the platforms used to capture the corresponding PCVS, with respect to a fixed coordinate system established in space (e.g. earth coordinates), during capturing the corresponding PCVS. The LoS can define a position and/or an orientation of the platform with respect to the fixed coordinate system.

When using the system according to the presently disclosed subject matter, it is desirable to adjust any PCVS that is displayed to an operator of an operating platform (a platform that is currently moving) to a LoS of the operating platform with respect to the fixed coordinate system established in space. Such adjustment is aimed at displaying the PCVSs as if they were captured from the same LoS of the operating platform with respect to the fixed coordinate system established in space. Having the information of the LoS of the sensor of the platform used to capture the PCVSs can be used for selecting the PCVSs that include the RoI of the operating platform, and for adjusting the selected PCVSs to the LoS of the operating platform, as further detailed herein. It is to be noted that in some cases the selection of the PCVSs can be based on a prioritization algorithm, e.g. based on visibility of the RoI within the PCVSs.

Accordingly, assuming that a pilot of an operating aircraft approaches landing during bad weather conditions which result in bad visibility of the runway on which the aircraft is to land, the presently disclosed system can select one or more of the PCVSs that include the runways in a manner that enables adjusting the PCVSs to the LoS of the landing aircraft, so that the situational awareness of the pilot of the landing aircraft will be improved due to the fact that the PCVSs that are displayed to the pilot were captured at better weather conditions and they provide better visibility of the runways.

In some cases, when the operating aircraft has a SVS, the PCVSs that are selected and adjusted can be displayed to the pilot of the operating aircraft as an overlay on top of the SVS, or by blending the PCVSs with the SVS video, or by displaying the PCVSs in a sub-portion of a screen of the SVS.

Additionally, or alternatively, in case the operating aircraft has an EVS that displays a real-time video generated by a sensor (e.g. a camera, a radar) in real time, the PCVSs that are selected and adjusted can be displayed to the pilot of the operating aircraft blended with the real-time video, optionally also blended with SVS if available.

Figure 3A:
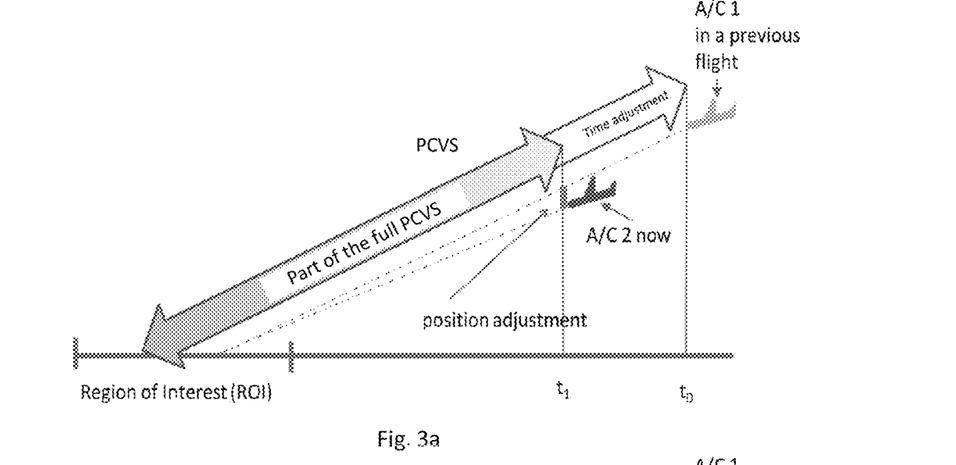
FIGS. 3a and 3b are illustrations of adjustment parameters for adjusting videos captured during previous operations to an active operation, in accordance with the presently disclosed subject matter.
Figure 3B:
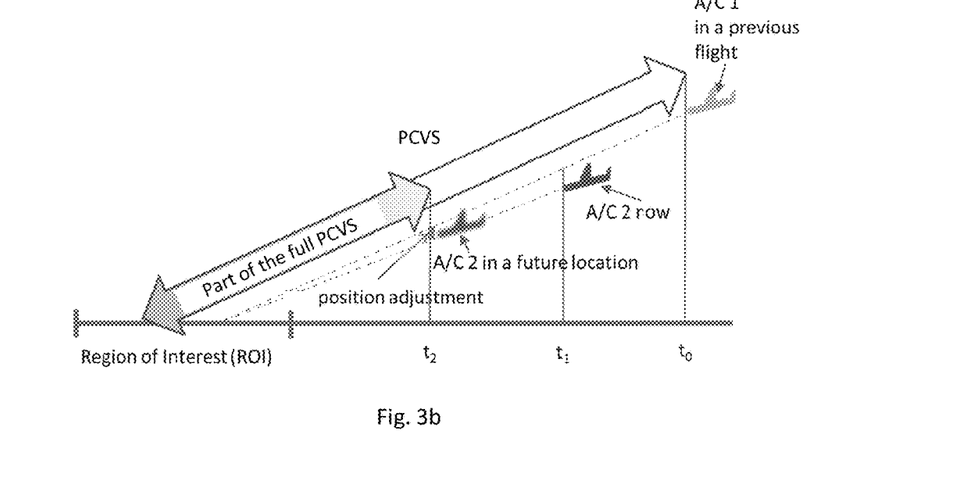

Attention is drawn to FIGS. 3a and 3b, both illustrating adjustment parameters for adjusting videos captured during previous operations to an active operation, in accordance with the presently disclosed subject matter.

FIG. 3a shows a first aircraft A/C 1 and a first path thereof during a previous flight towards landing in a Region of Interest (ROI), and a second aircraft A/C 2, and a second path thereof (which is its planned path for landing, which is clearly different than the first path of A/C 1) during an active flight towards landing in the same ROI. A/C 1 captured one of the PCVSs during its landing. In order for such PCVS to be displayed to a pilot of A/C 2 it needs to be adjusted, both in terms of time, and LoS. Assuming that the PCVS acquired by A/C 1 begins at time $t_0$ before landing, and that A/C 2 is currently at time $t_1$ before landing, while $t_1$ is smaller than $t_0$, only a certain portion of the PCVS should be displayed, namely the portion that starts $t_0$-$t_1$ from the beginning of the PCVS (assuming that the speeds of A/C 1 and A/C 2 are substantially identical). In addition to the time adjustment, the PCVS is captured from positions and orientations of A/C 1 with respect to the ROI that are different than the positions and orientations of A/C 2 with respect to the ROI. Accordingly, the PCVS needs to be adjusted to compensate for such differences. FIG. 3b shows the same elements as shown in FIG. 3a, with an addition of an estimation of a future position of A/C 2. The required adjustments are similar, but they are based on the estimated future position of A/C 2, instead of its current position. It is to be noted that in some cases, speed adjustment can also be made, taking into account the speed of A/C 1 during capturing the PCVS and the real time speed of A/C 2.

Turning to FIG. 4, there is shown a block diagram schematically illustrating one example of a video display system, in accordance with the presently disclosed subject matter.

According to certain examples of the presently disclosed subject matter, an operating platform 200 (e.g. an aerial vehicle, a land vehicle, a nautical vehicle) comprises system 205. System 205 comprises, or be otherwise associated with, a data repository 270 (e.g. a database, a storage system, a memory including Read Only Memory—ROM, Random Access Memory—RAM, or any other type of memory, etc.) configured to store data, including inter alia a plurality of previously captured video segments (PCVSs) captured during previous operations of platforms and metadata associated therewith. Each of the PCVSs is associated with metadata indicative of a Line-of-Sight (LoS) of a sensor (e.g. a camera, a radar, etc.), carried by the corresponding platform of the platforms used to capture the corresponding PCVS, with respect to a fixed coordinate system established in space (e.g. earth coordinates), during capturing the corresponding PCVS. The LoS can define a position and/or an orientation with respect to the fixed coordinate system established in space. It is to be noted that the position can be derived from measurements of the platform (e.g. from a position determination system of the platform) or of the sensor itself (e.g. from a position determination system of the sensor). It is to be further noted that if the sensor is gimbled, the orientation depends on the platform and on the sensor, whereas if the sensor is not gimbled, the orientation depends on the platform only.

In some cases, the data repository 270 can store PCVSs that are relevant for a planned operation of the platform. In such cases, the PCVSs that are relevant for the planned operation of the platform are identified in accordance with the platform's planned route, so that only those PCVSs that include RoIs that are on the planned route (or viewable by an operator of the operating platform from the planned route), or a subset thereof, are stored on the data repository 270. In such cases, such PCVSs can be selected and copied from an external data repository (not shown), external to the operating platform, that stores a larger set of PCVSs.

In some cases, at least one of the PCVSs stored in the data repository 270 was captured during previous operations of the operating platform 200. In some cases, at least one of the PCVSs stored in the data repository 270 was captured during previous operations of another platform other than the operating platform 200.

In some cases, at least one of the PCVSs stored in the data repository 270 is an enhanced PCVS, generated by combining a first PCVS with at least part of a second PCVS to provide the enhances PCVS having enhanced visibility with respect to the first PCVS and the second PCVS. For example, assuming that the first PCVS includes a certain section in which a cloud appears covering parts of frames forming the first PCVS, negatively affecting the visibility of the first PCVS. In such case, those parts of frames forming the first PCVS that include the cloud can be replaced with identical parts of frames (whether originally identical, or adjusted by suitable computerized algorithms) of a one or more second PCVS in which no cloud is shown, thereby improving the overall visibility of the first PCVS (that is, after this processing, the enhanced PCVS).

Data repository 270 can be further configured to enable retrieval and/or update and/or deletion of the stored data. It is to be noted that in some cases, data repository 270 can be distributed, while the system 205 has access to the information stored thereon, including at least the PCVSs.

System 205 further comprises one or more LoS determination sensors 210, or be otherwise associated with one or more LoS determination sensors 210 of the operating platform 200, that can be used to determine a LoS of the operating platform 200 with respect to a fixed coordinate system established in space. The LoS can define a position and/or an orientation of the operating platform 200 with respect to the fixed coordinate system established in space (e.g. earth coordinates). The LoS can be used in PCVS selection processes as further detailed herein.

System 205 can optionally further comprise one or more scene sensing sensors 220 (e.g. cameras, radars, or any other sensor that can acquire readings of the scene viewable thereby), or be otherwise associated with one or more scene sensing sensor 220 of the operating platform 200. In such cases, videos captured by the scene sensing sensors 220 can be added to the pool of PCVSs upon completion of an active operation of the operating platform. In such cases, the information determined by the LoS determination sensors 210 can be utilized as metadata indicative of the LoS of the operating platform 200 during acquisition of the video (captured by the scene sensing sensors 220) that is to be added into the pool of PCVSs.

System 205 further comprises one or more processing resources 230. Processing resource 230 can be one or more processing units (e.g. central processing units), microprocessors, microcontrollers or any other computing devices or modules, including multiple and/or parallel and/or distributed processing units, which are adapted to independently or cooperatively process data for controlling relevant system 205 resources and for enabling operations related to system 205 resources.

The processing resource 230 can comprise a video display module 240 and/or a position determination module 250. According to some examples of the presently disclosed subject matter, video display module 240 can be configured to perform a video generation process, as further detailed herein, inter alia with respect to FIGS. 5 and 6.

According to some examples of the presently disclosed subject matter, position determination module 250 can be configured to perform a position determination process 500, as further detailed herein, inter alia with respect to FIG. 7.

Having described the system 205, attention is drawn to FIG. 5. FIG. 5 is a flowchart illustrating one example of a sequence of operations carried out for synthesizing videos of a Region of Interest (RoI), in accordance with the presently disclosed subject matter.

According to some examples of the presently disclosed subject matter, system 205, associated with a given operating platform 200, can be configured to perform a video generation process 300, e.g. utilizing the video display module 240. For this purpose, system 205 can be configured to provide a data repository (e.g. data repository 270) comprising a plurality of previously captured video segments (PCVSs) captured during previous operations of corresponding platforms (block 310). Each of the PCVSs stored in the data repository 270 is associated with metadata indicative of a Line-of-Sight (LoS) of a sensor, carried by the corresponding platform of the platforms used to capture the corresponding PCVS, with respect to a fixed coordinate system established in space (e.g. earth coordinates), during capturing the corresponding PCVS.

System 205 obtains an indication of a given Region of Interest (RoI) (block 320). The indication can be obtained from an operator of the operating platform 200, that can be a human operator or a computerized entity having control over at least part of the operation of the operating platform 200. In some cases, the RoI is determined using information of a current Head Mounted Display (HMD) LoS designation of an HMD worn by a human operator of the operating platform. Alternatively, the RoI can be automatically determined using information of a navigation route (that can optionally be pre-determined) of the operating platform 200, so that the RoI is, for example, a certain pre-defined area at a certain distance and angle with respect to the position of the operating platform 200 in the navigation route. It is to be noted that the RoI is an area that is of interest to the operator of the operating platform 200, whether it is currently visible thereto, or it will become visible thereto in the future during the active operation of the platform.

System 205 is further configured to identify one or more of the PCVSs that include at least part of the RoI, utilizing the LoSs associated with the PCVSs (block 330). Having knowledge of the position and orientation from which each PCVS was captured, can enable determining the geographical area covered thereby. This enables identifying PCVSs that include the RoI as indicated by the indication obtained at block 320. Those PCVSs that include at least part of the RoI are referred to herein as RoI matching PCVSs.

System 205 displays at least part of at least one of the RoI matching PCVSs on a display (e.g. a see-through display, a monitor, a head-up display, a down display, or any other display capable of displaying the RoI matching PCVSs) of the operating platform 200 to an operator of the operating platform 200 during a current operation of the operating platform 200 (block 340). The RoI matching PCVSs that include the displayed parts are referred to herein as displayed RoI matching PCVSs.

The displayed RoI matching PCVSs can optionally be displayed as an overlay, over another video, such as an SVS generated video or an EVS generated video. In some cases, the overlay can be over a part of the display on which the other video is displayed. Additionally, or alternatively, the displayed RoI matching PCVSs can be blended with another video, such as an SVS generated video or an EVS generated video. Additionally, or alternatively, the system 205 can add computer-generated symbology over the displayed RoI matching PCVSs, e.g. for emphasizing objects shown in the displayed RoI matching PCVSs. In cases the displayed RoI matching PCVSs is blended with another video, the system 205 can optionally mark the displayed RoI matching PCVSs in a manner that will enable an operator of the operating platform 200 to distinguish between the PCVSs and the other video.

In some cases, when the platform is airborne, the current operation during which the displayed RoI matching PCVSs are displayed to a pilot of landing of the airborne platform. In such cases, and optionally in other cases, the displayed RoI matching PCVSs can be anchored (e.g. using known methods and/or techniques) to earth coordinates so that landing the airborne platform is based on anchored data. Having PCVSs that are anchored can also enable autonomous landing of the airborne platform. Clearly in some cases, autonomous platforms rely on sensor data for its operation. In cases that the real-time sensor data is acquired at conditions that effect its quality, it may be desirable to use data acquired in the past at conditions that provide data of a better quality (e.g. data that enables more accurate or safer navigation of the platform than the real-time sensor data).

In some cases, the displayed RoI matching PCVSs are manually selected out of the RoI matching PCVSs, e.g. by an operator of the operating platform 200. Additionally, or alternatively, the displayed RoI matching PCVSs are identified so that the at least part of the RoI shown in each of the displayed RoI matching PCVSs meets a visibility criterion. In some cases, the visibility criteria can be a measure of the distance at which an object or light can be clearly discerned in the RoI matching PCVS. Accordingly, the system 205 may be configured to select the RoI matching PCVSs that provide the best visibility, thereby maximizing the situational awareness of the operator of the operating platform 200.

In some cases, each of the PCVSs is associated with a respective visibility score (as part of the metadata associated with each PCVS in the data repository 270), indicative of the visibility of the RoI within the respective PCVS. In such cases, the displayed RoI matching PCVSs are associated with respective visibility scores higher than the visibility scores of the PCVSs excluding the displayed RoI matching PCVSs.

The visibility scores referred to herein can be automatically determined, e.g. by suitable algorithms. In other cases, the visibility scores can be provided by a human operator that manually evaluates the PCVSs before they are entered into the data repository 270 (e.g. as part of the process of entering such PCVSs to the pool of available PCVSs).

In some cases, the metadata associated with each of the PCVSs can further comprise operation conditions indicative of conditions during capturing of the corresponding PCVS. In such cases, the system 205 can be further configured to obtain information of current operation conditions at a current time during performance of the current operation by the operating platform 200, and identify the RoI matching PCVSs at block 330 also utilizing the current operation conditions of the operating platform 200 and the operation conditions indicative of the conditions during capturing of the PCVSs.

The operation conditions during capturing of the corresponding PCVS can include one or more of: a time-of-day at which the corresponding PCVS was captured; a date at which the corresponding PCVS was captured; an identifier of an operator of the PCVS which operated the platform when the corresponding PCVS was captured; weather conditions at the location and time-of-day in which the corresponding PCVS was captured; or a Head Mounted Display (HMD) LoS designation when the corresponding PCVS was captured with respect to the fixed coordinate system established in space.

The current operation conditions of the operating platform 200 can include one or more of the following: a current time-of-day; a current date; an identifier of an operator of the operating platform; a current LoS of the operating platform with respect to the RoI; weather conditions at the current location of the operating platform and current time of day; or a current Head Mounted Display (HMD) LoS designation with respect to the fixed coordinate system established in space.

When utilizing the current operation conditions of the operating platform 200 and the operation conditions indicative of the conditions during capturing of the PCVSs, identification of the RoI matching PCVSs can be more accurate, and further enhance the situational awareness of the operator of the operating platform 200. For example, having information of a time-of-day during capturing the PCVSs and a current time-of-day can enable identifying PCVSs that were captured at similar times-of-day, so that when the current time-of-day indicates that there is daylight, the system 205 can identify those PCVSs that were captured during daylight for display to the operator of the operating platform 200. Similarly, having information of the operator of the operating platform 200 can enable, for example, preferring PCVSs that were captured by platforms operated by the same operator (that is psychologically expected to behave similarly to the current behavior), or the displayed RoI matching PCVSs can be selected from the RoI matching PCVSs based on preferences of such operator (e.g. time in day preferences of the pilot which indicate a preferred time of day in which the displayed RoI matching PCVSs were captured—affecting the brightness of the display, a preference relating to display of obstacles indicating if the displayed RoI matching PCVSs are displayed along with obstacles information of obstacles around the runway or just the runway itself, etc.). Still further, having information of a current LoS (and optionally a current LoS designation of a HMD) can enable, for example, preferring PCVSs associated with LoSs (and optionally designated LoSs designated by the HMD during capturing such PCVSs) that are similar to the current LoS.

In some cases, the system 205 can be configured to obtain, in addition to the RoI, an indication of a simulated LoS with respect to the RoI, simulating a position and/or an orientation of the operating platform, or a scene sensing sensor 220 thereof, with respect to the RoI (based on the RoI's coordinates in the fixed coordinate system established in space). The simulated LoS can enable zooming in towards the RoI. Additionally. or alternatively the simulated LoS can be indicative of predicted/estimated future positions and/or orientations of the operating platform, or the scene sensing sensor 220 thereof, with respect to the RoI. In such cases, the displayed RoI matching PCVSs, displayed at block 340, can be selected from the RoI matching PCVSs also utilizing the simulated LoS, so that RoI matching PCVSs that are associated with LoSs that are similar to the simulated LoS are preferred over other RoI matching PCVSs.

It is to be noted that having the ability to "navigate" in time as suggested herein can improve the ability of the operator of the operating platform 200 to make educated decisions based on a prediction of visual information (that is based itself on visual information acquired during previous operations—the PCVSs) that the operator of the operating platform is expected to see in a future point in time. This can enable better maneuvering of the operating platform 200, based on visual information. This can also enable selecting navigation routes, flare guidance, etc.

As indicated herein, in some cases, the displayed RoI matching PCVSs are adjusted by the system 205, before their display, to compensate for differences between the current (or predicted) LoS of the operating platform with respect to the RoI (based on the RoI's coordinates in the fixed coordinate system established in space) and the LoS of the sensor carried by the corresponding platform and used to capture the corresponding PCVS, with respect to the fixed coordinate system established in space. The compensation is further explained with reference to FIGS. 3a and 3b. The goal of the adjustment is to adjust the PCVSs to the current (or predicted) position and/or orientation of the operating platform 200 with respect to the fixed coordinate system established in space, so that they will appear as if they were captured from the same position and/or orientation with respect to the fixed coordinate system established in space.

It is to be noted that in some cases, when the PCVSs are anchored (e.g. to earth coordinates), comparison of frames of the PCVSs with current frames acquired by a scene sensing sensor 220 of the operating platform 200 can enable determining its location with respect to earth coordinates.

It is to be further noted that in some cases, the PCVSs can be used for adding synthetic information to a display of a SVS displaying real-time data and/or for manipulating synthetic information displayed on a display of a SVS. For example, the PCVSs can be analyzed to identify obstacles (e.g. by video/image analysis), and the results of such analysis can be used for adding information of unknown obstacles that are not marked on an obstacles database used by the SVS, and/or for updating properties of the obstacles if they do exist on the obstacles database used by the SVS, but require updating (e.g. adjusting their position/size/shape parameters, etc.). Accordingly, the PCVSs that are obtained during previous operations can be used by real-time systems that generate synthetic data for improving such real-time systems' performance (accuracy, reliability, etc.).

It is to be still further noted that, with reference to FIG. 5, some of the blocks can be integrated into a consolidated block or can be broken down to a few blocks and/or other blocks may be added. Furthermore, in some cases, the blocks can be performed in a different order than described herein (for example, block 320 can be performed before block 310, etc.). It is to be further noted that some of the blocks are optional. It should be also noted that whilst the flow diagram is described also with reference to the system elements that realizes them, this is by no means binding, and the blocks can be performed by elements other than those described herein.

Turning to FIG. 6, a flowchart illustrating one example of a sequence of operations carried out for synthesizing videos of a plurality of Regions of Interest (RoIs), in accordance with the presently disclosed subject matter, is shown.

According to some examples of the presently disclosed subject matter, system 205, associated with a given operating platform 200, can be configured to perform a multi-RoI video generation process 400, e.g. utilizing the video display module 240. The multi-RoI video generation process 400 is similar to video generation process 300, but it is aimed at overlaying PCVSs over a plurality of RoIs shown in a video displayed to an operator of the operating platform 200. For this purpose, system 205 can be configured to obtain additional indications of additional RoIs, in addition to the indication of the RoI obtained at block 320 (block 410).

Based on the obtained additional indications, system 205 identifies one or more of the PCVSs that include at least part of the additional RoIs, utilizing the LoSs associated with the PCVSs, giving rise to additional RoI matching PCVSs, additional to the RoI matching PCVSs identified at block 330 (block 420).

System 205 further displays at least part of the additional RoI matching PCVSs, being additional displayed RoI matching PCVSs (in addition to the displayed RoI matching PCVSs displayed at block 340), on the display of the operating platform 200 as additional overlays over another video displayed on the display (e.g. an SVS generated video or an EVS generated video) (block 430).

Accordingly, an operator of the operating platform 200 can designate a plurality of RoIs, and receive as output on a display, PCVSs that improve the operator's situational awareness.

It is to be noted that, with reference to FIG. 6, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

FIG. 7 is a flowchart illustrating one example of a sequence of operations carried out for determining a position of an operating platform, in accordance with the presently disclosed subject matter.

According to some examples of the presently disclosed subject matter, system 205, associated with a given operating platform 200, can be configured to perform a position determination process 500, e.g. utilizing the position determination module 250. For this purpose, system 205 can be configured to provide a data repository (e.g. data repository 270) comprising a plurality of previously captured video segments (PCVSs) captured during previous operations of corresponding platforms and anchored to earth coordinates (block 510). Each of the PCVSs stored in the data repository 270 is associated with metadata indicative of a Line-of-Sight (LoS) of a sensor, carried by the corresponding platform of the platforms used to capture the corresponding PCVS, with respect to earth coordinates, during capturing the corresponding PCVS.

System 205 obtains an indication of a given Region of Interest (RoI) and an image captured by a scene sensing sensor 220 of the operating platform 200, the image including the RoI (block 520). The indication can be obtained from an operator of the operating platform 200, that can be a human operator or a computerized entity having control over at least part of the operation of the operating platform 200. In some cases, the RoI is determined using information of a current Head Mounted Display (HMD) LoS designation of an HMD worn by a human operator of the operating platform. Alternatively, the RoI can be automatically determined using information of a navigation route (that can optionally be pre-determined) of the operating platform 200, so that the RoI is, for example, a certain pre-defined area at a certain distance and angle with respect to the position of the operating platform 200 in the navigation route. It is to be noted that the RoI is an area that is of interest to the operator of the operating platform 200, whether it is currently visible thereto, or it will become visible thereto in the future during the active operation of the platform.

System 205 is further configured to identify one or more of the PCVSs that include at least part of the RoI, utilizing the LoSs associated with the PCVSs (block 530). Having knowledge of the position and orientation from which each PCVS was captured, can enable determining the geographical area covered thereby. This enables identifying PCVSs that include the RoI as indicated by the indication obtained at block 320. Those PCVSs that include at least part of the RoI are referred to herein as RoI matching PCVSs.

System 205 utilizes at least one frame of at least one of the RoI matching PCVSs determine a position of the operating platform 200 by comparing the image obtained at block 520 with at least one frame of at least one PCVS (block 540). Due to fact that the PCVSs are anchored to earth coordinates, comparing them with an image acquired from an unknown, or an inaccurate, position can enable determining the position from which the image was captured with respect to earth coordinates. This can enable validating Global Positioning System (GPS) readings, and/or determining a position of the operating platform 200 without a GPS at all.

It is to be noted that, with reference to FIG. 7, some of the blocks can be integrated into a consolidated block or can be broken down to a few blocks and/or other blocks may be added. Furthermore, in some cases, the blocks can be performed in a different order than described herein (for example, block 520 can be performed before block 510, etc.). It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for displaying a video for operating a platform, comprising a processing resource configured to:
provide a data repository comprising a plurality of previously captured video segments (PCVSs) captured during previous operations of corresponding platforms, wherein each of the PCVSs being associated with metadata indicative of a Line-of-Sight (LoS) of a sensor, carried by the corresponding platform of the platforms used to capture the corresponding PCVS, with respect to a fixed coordinate system established in space, during capturing the corresponding PCVS;
obtain an indication of a Region-of-Interest (RoI);
identify one or more of the PCVSs that include at least part of the RoI, utilizing the LoSs associated with the PCVSs, giving rise to RoI matching PCVSs;
adjust at least part of at least one of the RoI matching PCVSs, being displayed RoI matching PCVSs, to compensate for differences between (i) the current LoS of the platform with respect to the RoI and (ii) the LoS of the sensor carried by the corresponding platform, used to capture the corresponding PCVS with respect to the fixed coordinate system established in space; and
display the displayed RoI matching PCVSs on a display during a current operation of the platform.

2. The system of claim 1, wherein the displayed RoI matching PCVSs are identified so that the at least part of the RoI shown in each of the displayed RoI matching PCVSs meets a visibility criterion.

3. The system of claim 1, wherein each of the PCVSs is associated with a respective visibility score, indicative of the visibility of the RoI within the respective PCVS, and wherein the displayed RoI matching PCVSs are associated with respective visibility scores higher than the visibility scores of the PCVSs excluding the displayed RoI matching PCVSs.

4. The system of claim 1, wherein the metadata further comprises operation conditions indicative of conditions during capturing of the corresponding PCVS, and wherein the processing resource is further configured to obtain information of current operation conditions at a current time during performance of the current operation, and wherein the RoI matching PCVSs are identified also utilizing the current operation conditions and the operation conditions.

5. The system of claim 4, wherein the operation conditions include one or more of the following:
a. a time-of-day at which the corresponding PCVS was captured;
b. a date at which the corresponding PCVS was captured;
c. an identifier of an operator of the PCVS which operated the platform when the corresponding PCVS was captured;
d. weather conditions at a location on which the corresponding PCVS was captured and on the time-of-day in which the corresponding PCVS was captured; or e. a Head Mounted Display (HMD) LoS designation when the corresponding PCVS was captured with respect to the fixed coordinate system established in space.

6. The system of claim 4, wherein the current operation conditions include one or more of the following:
   a. a current time-of-day;
   b. a current date;
   c. an identifier of an operator of the platform;
   d. a current LoS of the platform with respect to the RoI;
   e. weather conditions at a current location of the platform and a current time of day; or
   f. a current Head Mounted Display (HMD) LoS designation with respect to the fixed coordinate system established in space.

7. The system of claim 1, wherein the RoI is determined also using information of a current Head Mounted Display (HMD) LoS designation of an HMD worn by the operator of the platform.

8. The system of claim 1, wherein the processing resource is further configured to:
   obtain additional indications of additional RoIs;
   identify one or more of the PCVSs that include at least part of the additional RoIs, utilizing the LoSs associated with the PCVSs, giving rise to additional RoI matching PCVSs; and
   display at least part of the additional RoI matching PCVSs, being additional displayed RoI matching PCVSs, on the display as overlays over another video.

9. The system of claim 1, wherein the ROI is determined based on a navigation route of the platform.

10. A method for displaying videos for operating a platform, the method comprising:
    providing a data repository comprising a plurality of previously captured video segments (PCVSs) captured during previous operations of corresponding platforms, wherein each of the PCVSs being associated with metadata indicative of a Line-of-Sight (LoS) of a sensor, carried by the corresponding platform of the platforms used to capture the corresponding PCVS, with respect to a fixed coordinate system established in space, during capturing the corresponding PCVS;
    obtaining, by a processing resource, an indication of a Region-of-Interest (RoI);
    identifying, by the processing resource, one or more of the PCVSs that include at least part of the RoI, utilizing the LoSs associated with the PCVSs, giving rise to RoI matching PCVSs; and
    adjusting, by the processing resource, at least part of at least one of the RoI matching PCVSs, being displayed RoI matching PCVSs, to compensate for differences between (i) the current LoS of the platform with respect to the RoI and (ii) the LoS of the sensor carried by the corresponding platform, used to capture the corresponding PCVS with respect to the fixed coordinate system established in space; and
    displaying, by the processing resource, the displayed RoI matching PCVSs on a display to an operator of the platform during a current operation of the platform.

11. The method of claim 10, wherein the displayed RoI matching PCVSs are identified so that the at least part of the RoI shown in each of the displayed RoI matching PCVSs meets a visibility criterion.

12. The method of claim 10, wherein each of the PCVSs is associated with a respective visibility score, indicative of the visibility of the RoI within the respective PCVS, and wherein the displayed RoI matching PCVSs are associated with respective visibility scores higher than the visibility scores of the PCVSs excluding the displayed RoI matching PCVSs.

13. The method of claim 10, wherein the metadata further comprises operation conditions indicative of conditions during capturing of the corresponding PCVS, and wherein the method further comprises obtaining information of current operation conditions at a current time during performance of the current operation, and wherein the RoI matching PCVSs are identified also utilizing the current operation conditions and the operation conditions.

14. The method of claim 13, wherein the operation conditions include one or more of the following:
    a. a time-of-day at which the corresponding PCVS was captured;
    b. a date at which the corresponding PCVS was captured;
    c. an identifier of an operator of the PCVS which operated the platform when the corresponding PCVS was captured;
    d. weather conditions at a location on which the corresponding PCVS was captured and on the time-of-day in which the corresponding PCVS was captured; or
    e. a Head Mounted Display (HMD) LoS designation when the corresponding PCVS was captured with respect to the fixed coordinate system established in space.

15. The method of claim 13, wherein the current operation conditions include one or more of the following:
    a. a current time-of-day;
    b. a current date;
    c. an identifier of an operator of the platform;
    d. a current LoS of the platform with respect to the RoI;
    e. weather conditions at a current location of the platform and a current time of day; or
    f. a current Head Mounted Display (HMD) LoS designation with respect to the fixed coordinate system established in space.

16. The method of claim 10, wherein the RoI is determined also using information of a current Head Mounted Display (HMD) LoS designation of an HMD worn by the operator of the platform.

17. The method of claim 10, further comprising:
    obtaining, by the processing resource, additional indications of additional RoIs;
    identifying, by the processing resource, one or more of the PCVSs that include at least part of the additional RoIs, utilizing the LoSs associated with the PCVSs, giving rise to additional RoI matching PCVSs; and
    displaying, by the processing resource, at least part of the additional RoI matching PCVSs, being additional displayed RoI matching PCVSs, on the display as overlays over another video.

18. The method of claim 10, wherein at least one of the PCVSs is an enhanced PCVS, generated by combining a first PCVS with at least part of a second PCVS to provide the enhances PCVS having enhanced visibility with respect to the first PCVS and the second PCVS.

19. The Method of claim 10, wherein the ROI is determined based on a navigation route of the platform.

20. A non-transitory computer readable storage medium having computer readable program code embodied therewith, the computer readable program code, executable by at least one processor of a computer to perform a method comprising:
    providing a data repository comprising a plurality of previously captured video segments (PCVSs) captured during previous operations of corresponding platforms, wherein each of the PCVSs being associated with metadata indicative of a Line-of-Sight (LoS) of a sensor, carried by the corresponding platform of the platforms used to capture the corresponding PCVS, with respect to a fixed coordinate system established in space, during capturing the corresponding PCVS;

obtaining, by a processing resource, an indication of a Region-of-Interest (RoI);

identifying, by the processing resource, one or more of the PCVSs that include at least part of the RoI, utilizing the LoSs associated with the PCVSs, giving rise to RoI matching PCVSs; and adjusting, by the processing resource, at least part of at least one of the RoI matching PCVSs, being displayed RoI matching PCVSs, to compensate for differences between (i) the current LoS of the platform with respect to the RoI and (ii) the LoS of the sensor carried by the corresponding platform, used to capture the corresponding PCVS with respect to the fixed coordinate system established in space; and displaying, by the processing resource, the displayed RoI matching PCVSs on a display to an operator of the platform during a current operation of the platform.

* * * * *